United States Patent
Grant et al.

(10) Patent No.: US 11,666,956 B2
(45) Date of Patent: Jun. 6, 2023

(54) METHOD FOR MITIGATING ACID ROCK DRAINAGE POTENTIAL THROUGH THE SMOLDERING COMBUSTION OF ORGANIC MATERIALS

(71) Applicant: Geosyntec Consultants, Inc., Boca Raton, FL (US)

(72) Inventors: Gavin Grant, Etabicoke (CA); David Major, Guelph (CA); Grant Scholes, Guelph (CA); Silvia Mancini, Boca Raton, FL (US); Christine Switzer, Edinburgh (GB)

(73) Assignee: Geosyntec Consultants, Inc., Boca Raton, FL (US)

( * ) Notice: Subject to any disclaimer, the term of this patent is extended or adjusted under 35 U.S.C. 154(b) by 305 days.

(21) Appl. No.: 16/846,536

(22) Filed: Apr. 13, 2020

(65) Prior Publication Data
US 2020/0331043 A1     Oct. 22, 2020

Related U.S. Application Data

(60) Provisional application No. 62/835,629, filed on Apr. 18, 2019.

(51) Int. Cl.
| | |
|---|---|
| *A62D 3/40* | (2007.01) |
| *B09C 1/06* | (2006.01) |
| *A62D 3/36* | (2007.01) |
| *A62D 3/37* | (2007.01) |
| *A62D 3/38* | (2007.01) |
| *B09C 1/08* | (2006.01) |
| *F23G 5/02* | (2006.01) |
| *F23G 5/34* | (2006.01) |
| *A62D 101/47* | (2007.01) |

(52) U.S. Cl.
CPC ............... *B09C 1/06* (2013.01); *A62D 3/36* (2013.01); *A62D 3/37* (2013.01); *A62D 3/38* (2013.01); *A62D 3/40* (2013.01); *B09C 1/08* (2013.01); *F23G 5/02* (2013.01); *F23G 5/34* (2013.01); *A62D 2101/47* (2013.01)

(58) Field of Classification Search
None
See application file for complete search history.

(56) References Cited

U.S. PATENT DOCUMENTS

| | | | | |
|---|---|---|---|---|
| 2012/0272878 A1* | 11/2012 | Grant | ............. | F23G 7/05 |
| | | | | 110/346 |
| 2014/0241806 A1* | 8/2014 | Rockwell | .............. | F23G 7/14 |
| | | | | 405/128.85 |
| 2014/0288833 A1* | 9/2014 | Lee | ............. | G01N 33/24 |
| | | | | 702/2 |

FOREIGN PATENT DOCUMENTS

| | | | |
|---|---|---|---|
| WO | 2012154402 A1 | | 11/2012 |
| WO | 2014093469 A2 | | 6/2014 |
| WO | 2017091623 | * | 6/2017 |
| WO | 2018220492 A1 | | 12/2018 |

OTHER PUBLICATIONS

International Searching Authority—International Search Report—International Application No. PCT/US2020/027896 dated Jul. 27, 2020, together with the Written Opinion of the International Searching Authority, 13 pages.

* cited by examiner

Primary Examiner — Sheng H Davis
(74) Attorney, Agent, or Firm — Sunstein LLP

(57) ABSTRACT

Methods are provided for the removal of sulfur and other ARD/AMD-generating materials through the smoldering combustion of an organic material. The methods comprise admixing an ARD/AMD-generating porous matrix material with an organic material to produce a mixture, exposing the mixture to an oxidant, and initiating a self-sustaining smoldering combustion of the mixture. Additional embodiments aggregate the organic material or ARD/AMD-generating porous matrix material or mixture thereof in an impoundment such as a reaction vessel, depression or matrix pile. Further embodiments utilize at least one heater to initiate combustion and at least one air supply port to supply oxidant to initiate and maintain combustion.

20 Claims, 12 Drawing Sheets

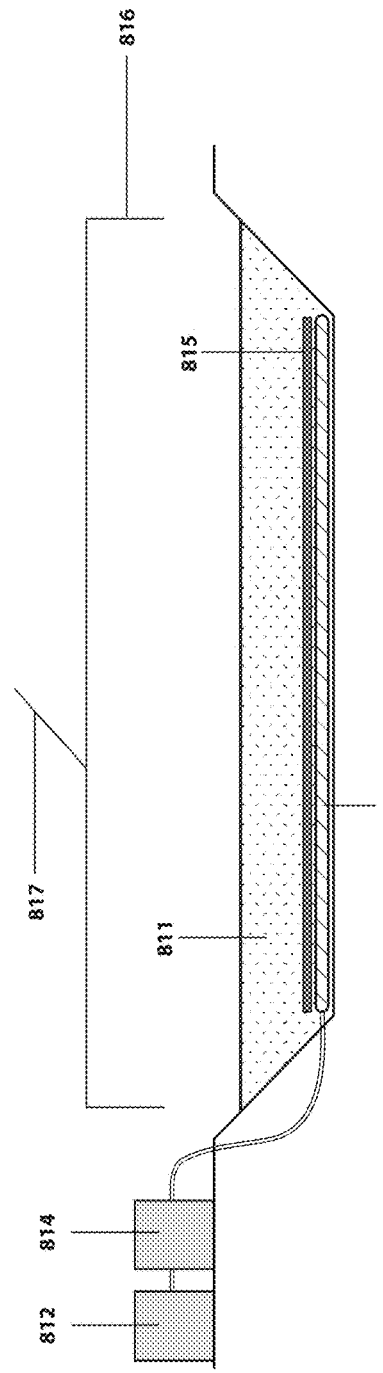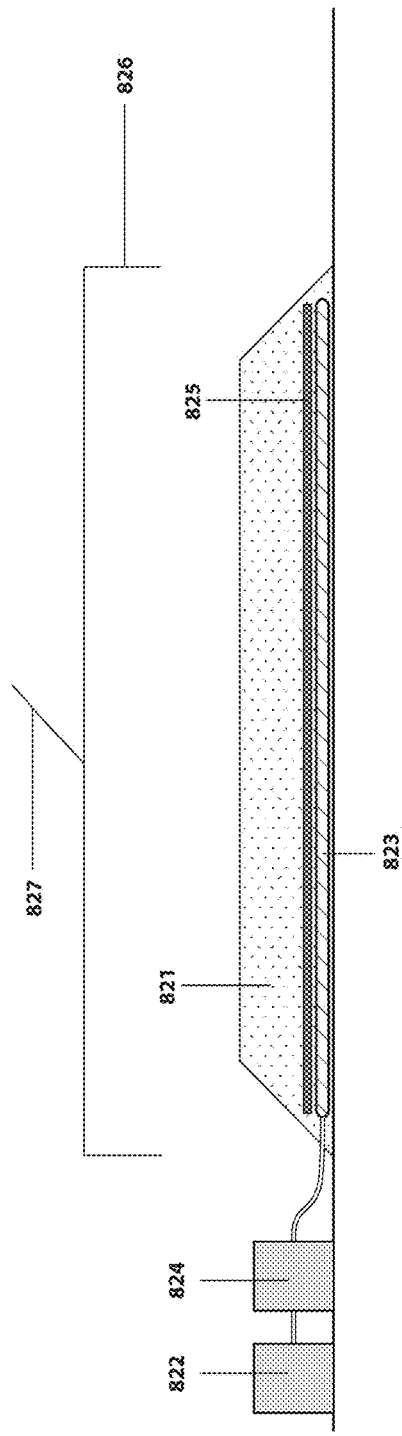

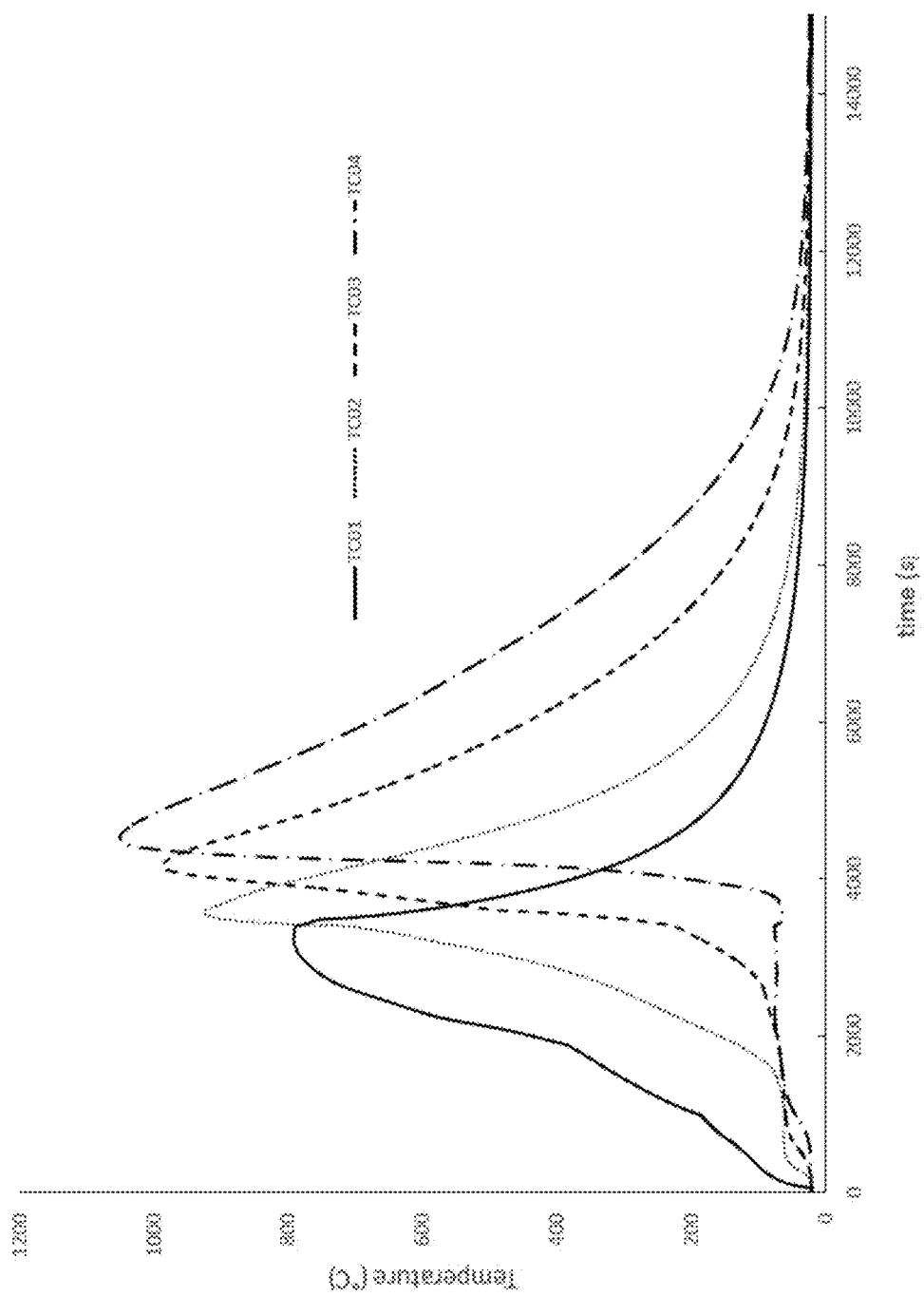

METHOD FOR MITIGATING ACID ROCK DRAINAGE POTENTIAL THROUGH THE SMOLDERING COMBUSTION OF ORGANIC MATERIALS

CROSS-REFERENCE TO RELATED APPLICATIONS

The present application claims the benefit of U.S. Provisional Patent Application No. 62/835,629, filed Apr. 18, 2019. The disclosure of this application is incorporated by reference herein in its entirety.

TECHNICAL FIELD

The present invention relates to methods for mitigating acid rock drainage (ARD) or acid mine drainage (AMD) potential through the smoldering combustion of organic materials, including the smoldering combustion of organic liquids or solids embedded or mixed with porous mine tailings.

BACKGROUND ART

Recent advances in the field of contaminant hydrogeology have demonstrated that organic contaminants can be remediated through smoldering combustion. This process is known commercially as the Self-sustaining Treatment for Active Remediation (STAR) technology and is the subject of U.S. Pat. No. 8,132,987.

Smoldering refers to combustion of a material at the surface of the solid or liquid material itself. For example, when a combustible material (e.g., tobacco) is compacted to form a porous solid (e.g., a cigarette) and is ignited, the oxidant (e.g., oxygen) diffuses into the surface of the material and the combustion proceeds at the surface of the tobacco leaf fragment. Smoldering is referred to as a heterogeneous combustion reaction because the oxidant (gas) and the fuel (liquid or solid) are distinct phases. This is in contrast to flaming combustion which is a homogeneous reaction occurring in a single (gas) phase.

The smoldering combustion process results in the generation of energy, water, and vaporous emissions, primarily carbon dioxide, carbon monoxide, and to a lesser extent volatile organic compounds and other compounds depending on the conditions of the smoldering system.

Smoldering combustion requires a short duration energy input, and the addition of an oxidant (e.g., oxygen, air, etc.) to initiate and sustain the smoldering combustion reaction. An example of a smoldering combustion reaction is that of a burning charcoal briquette. Smoldering combustion is only possible in the presence of a fuel source and a porous matrix. For the case of a charcoal briquette, the charcoal is both the fuel and the porous matrix; whereas for the STAR process, the fuel is the organic contaminant and the porous matrix is a volume of soil.

Acid rock drainage (ARD) or acid mine drainage (AMD) is an environmental hazard characteristic of mining and other large construction activities, usually within rocks containing an abundance of sulfide minerals. ARD/AMD is often associated with mine tailings (i.e., waste rock), and is characterized as the low pH liquid, often containing toxic metals such as copper or iron draining from these piles, which can have a detrimental impact on streams other aquatic environments.

Acidic conditions are generated primarily through the oxidation of acid-progenitors, the most common of which are metal sulfides (often pyrite, which is iron sulfide) when tailings and other waste rocks are exposed to air and water. Such tailings and other waste rocks are typically present in the form of a porous matrix, which is categorized herein as a porous acid-progenitor matrix. Many acid rock discharges also contain elevated levels of potentially toxic metals that dissolve in the low pH liquid associated with ARD/AMD, especially nickel and copper with lower levels of a range of trace and semi-metal ions, including lead, arsenic, aluminum, and manganese ions.

At some mines, acidic drainage is detected within 2-5 years after mining begins; whereas at other mines, it is not detected for several decades. However, acidic drainage may be generated for decades or centuries after it is first detected. Thus, ARD/AMD is considered a serious long-term environmental issue associated with mining.

Numerous management strategies exist for ARD/AMD including passive and active approaches. Passive approaches include long-term monitoring, with many discharges from abandoned mines being exempt from regulatory control, or the use of constructed wetlands in which metals are precipitated through oxidation or undergo complexation with organic matter after drainage waters are neutralized, typically through a limestone-based treatment process.

Constructed wetlands are a relatively low-cost solution but are limited by the metal loading capacity and the need for wetland sediments to remain largely or permanently submerged (since some metal precipitates retained in sediments are unstable when exposed to oxygen such as copper sulfide or elemental selenium).

There are numerous active technologies for treating ARD/AMD. The most common commercial process is lime (CaO) precipitation in a high-density sludge (HDS). In this application, a slurry of lime is dispersed into a tank containing acid mine drainage and recycled sludge to increase water pH to about 9. At this pH, most toxic metals become insoluble and precipitate, aided by the presence of recycled sludge. In some applications air may be introduced to oxidize and precipitate iron and manganese. The resulting slurry is directed to a sludge-settling vessel, such as a clarifier.

Less complex variants of this process, such as simple lime neutralization, may involve no more than a lime silo, mixing tank and settling pond. These systems are far less costly to build, but are also less efficient (i.e., longer reaction times are required, and they produce a discharge with higher trace metal concentrations, if present).

Other active techniques include calcium silicate neutralization, carbonate neutralization, ion exchange, and metal sulfide precipitation.

In the calcium silicate process, a calcium silicate feedstock, made from processed steel slag, is used to neutralize the liquid by removing free hydrogen ions from the bulk solution, thereby increasing pH. With carbonate neutralization, limestone chips are used to create a neutralizing effect. In cation exchange processes, a resin issued to remove potentially toxic metals (cationic resins), or chlorides, sulfates and uranyl sulfate complexes (anionic resins) from mine water. For metal sulfide precipitation, base metals in the acidic solution are precipitated through contact with free sulfide to produce a base metal-free effluent that can be discharged or further treated to reduce sulfate, and a metal sulfide concentrate with possible economic value.

Many technologies exist for the treatment of ARD/AMD, from traditional high cost water treatment plants to simple in situ water treatment reagent dosing methods. In all cases, these techniques manage the problem once it exists. That is, these techniques are designed to treat acidic, metal ionbearing water. However, the root cause of ARD/AMD is the generation of acidic conditions through the oxidation of metal sulfides when tailings and other waste rocks are exposed to air and water. Thus, ARD/AMD can be prevented or substantially reduced if metal sulfides are removed from the tailings and waste rocks prior to disposal or as part of a post-disposal remediation strategy.

Metals sulfides can be removed from rocky materials such as tailings and mine waste rock via thermal methods. For example, pyrite will undergo thermal decomposition into elemental sulfur and iron sulfide when heated to a temperature of approximately 540 degrees Celsius, while eliminating sulfur in a concentrated source (usually pyrite) is best suited to roasting temperatures in the range of 600 to 1000 degrees Celsius.

SUMMARY OF THE EMBODIMENTS

Embodiments described herein rely on the principles of self-sustained smoldering combustion of organic materials and provide benefits over currently available techniques for managing ARD/AMD due to low energy requirements and low cost. Specifically, a liquid or solid organic material (e.g., carbon) can be admixed with a porous acid-progenitor matrix, such as mine tailings and combusted via a self-sustaining smoldering combustion reaction within a combustion front to remove acid progenitors including sulfur, sulfur compounds, and other compounds that react with air and water to create acidic conditions. As smoldering combustion occurs, the combustion front moves through the mixture, removing acid progenitors, and leaving behind a zone of acid-progenitor-depleted material. The organic material is admixed with the tailings or other porous acid-progenitor matrices to produce a mixture through which an oxidant is forced and smoldering is initiated with a heat source. The heat source is then removed or terminated while the oxidant feed is maintained so as to sustain progression of the smoldering reaction through the mixture and the removal of acid progenitors.

In an embodiment of the invention a method is provided for removing acid progenitors through smoldering combustion of an organic material, the method including (1) providing a mixture of the organic material, and a porous acid-progenitor matrix to an impoundment, (2) heating a portion of the mixture, and (3) exposing the mixture to at least one oxidant so as to initiate self-sustaining smoldering combustion of the mixture, thereby creating a zone of smoldering combustion and leaving behind a zone of acid-progenitor-depleted material.

In some embodiments, the acid progenitors are sulfur containing species, such as are present in a porous acid-progenitor matrix composed of tailings. In some embodiments, the impoundment is a pile. In other embodiments, the impoundment is a reaction vessel or a depression. In some embodiments, the mixture is provided to the impoundment and acid-progenitor-depleted material is removed from the impoundment by means of a process selected from a group consisting of a continuous process, a semi-continuous process, and a batch process.

In some embodiments a mixing tool admixes the organic material with the porous matrix in the impoundment to produce the mixture. In some embodiments providing the mixture to the impoundment includes (1) forming a permanent or semi-permanent confinement bed comprising the porous matrix and (2) continuously pouring the organic material into the confinement bed.

In some embodiments the organic material admixed with the porous matrix is chosen from the group consisting of a liquid, an emulsion, a solid, a slurry, and combinations thereof. Some embodiments of the method include causing propagation of the combustion away from a point of ignition of the combustion. In some embodiments, the mixture is continuously fed into a zone of smoldering combustion.

In some embodiments, initiating smoldering combustion includes applying heat to the mixture from at least one internal conductive heating source in direct contact with the mixture. In some embodiments, initiating smoldering combustion includes applying heat to the mixture from at least one convective heating source coupled to the mixture. In some embodiments the at least one convective heating source is external to the mixture. In other embodiments the at least one convective heating source is located within the mixture. In further embodiments initiating smoldering combustion includes applying radiative heat to the mixture.

In some embodiments, exposing the mixture to at least one oxidant includes forcing oxidant through the mixture to initiate self-sustaining smoldering combustion of the mixture and cause the removal of acid-progenitors, thereby creating a zone of acid-progenitor-depleted material. In some embodiments, the oxidant is forced through the mixture by injecting air into the mixture through one or more injection ports. In yet other embodiments, the oxidant is forced through the mixture by creating a vacuum that sucks oxidant through the mixture. In some embodiments, air is forced through the mixture at a linear velocity of between 0.0001 and 100 centimeters per second.

In some embodiments, the method further comprises admixing a porous matrix material with the organic material using a helical mixing tool to produce the mixture, supplying the mixture via a first conveyor system into the zone of smoldering combustion, and removing the acid-progenitor-depleted material via a second conveyor system.

Some embodiments of the method further comprise carrying out the smoldering combustion at a temperature within a range between 200 and 2000 degrees Celsius.

In some embodiments, smoldering combustion is initiated by applying heat to the mixture from one or more internal conductive heating sources. In other embodiments, smoldering combustion is initiated by applying heat from one or more convective heat sources, where the convective heat sources may be external to the mixture, or located within the mixture. In yet other embodiments, the heat is applied as radiative heat.

In some embodiments, the porous matrix containing acid progenitors is subjected to one or more pre-treatment steps to increase smoldering temperature, or to increase sulfur reactivity. In some embodiments, the one or more pretreatment steps include pretreating the porous matrix containing acid progenitors with substances selected from the group consisting of acids, bases, activating compounds, catalysts, chelators, oxidants, and reducing agents, and any combination thereof.

It will be appreciated that while typically porous tailings material will provide the acid progenitors to be removed by smoldering combustion, the methods described herein will apply equally well to other porous acid-progenitor matrices.

In each of the above described embodiments, it is desired to promote/maintain self-sustained smoldering combustion as a method of removing acid-progenitors, including sulfur and other ARD/AMD-generating compounds from materials with the potential to generate acidic conditions.

BRIEF DESCRIPTION OF THE DRAWINGS

The foregoing features of embodiments will be more readily understood by reference to the following detailed description, taken with reference to the accompanying drawings, in which:

FIG. 8A is a cross-sectional schematic of another embodiment of the invention wherein a depression is filled with an admixture of organic material and porous acid-progenitor matrix. In this embodiment, air supply ports and heating elements are provided in-line with the supplied oxidant or within or beneath the depression. Vapors and products of the combustion reaction are collected at the surface of the depression with a vapor collection system and routed via a routing system for subsequent processing.

FIG. 8B is an embodiment of a matrix pile including an admixture of organic material and porous acid-progenitor matrix, oxidant source, air supply ports within the pile, and alternative heating elements. In this embodiment, air supply ports and heating elements are provided in-line with the supplied oxidant or within or beneath the matrix pile. Vapors and products of the combustion reaction are collected at the surface of the matrix pile with a vapor collection system and routed via a routing system for subsequent processing.

FIG. 12 presents the thermocouple profile for a combustion test involving a tailings mixture, showing strong self-sustaining smoldering behavior; that is, that temperatures at each location within the experimental apparatus continued to increase with time and that temperature-time curves from one location intersect temperature-time curves at the preceding location following the termination of heating from the heating elements.

DETAILED DESCRIPTION OF SPECIFIC EMBODIMENTS

Figure 1:
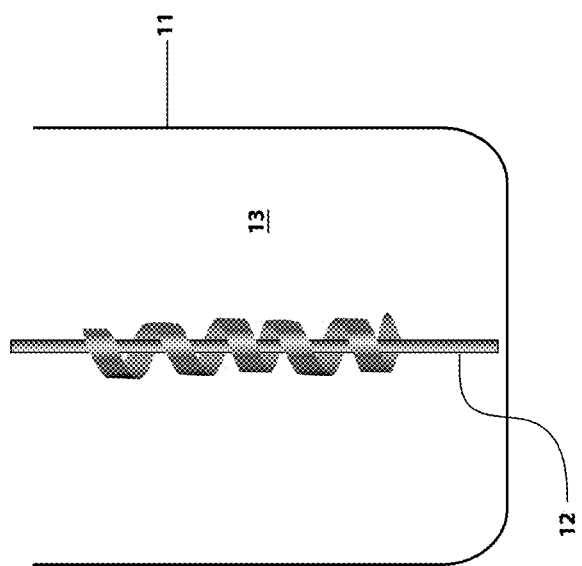
FIG. 1 is a schematic cross-sectional view of a mixing vessel of an embodiment of the invention, into which an organic material and a porous matrix of ARD/AMD-generating materials are added. Also provided in the embodiment is an exemplary helical mixing tool that is used to create an admixture of organic material and porous matrix.

Embodiments of the present invention are based on using smoldering combustion to remove acid-progenitors, including sulfur and other ARD/AMD-generating compounds from materials with the potential to generate acidic conditions.

In embodiments of the present invention, the porous matrix is the material to be treated and serves as a scaffold to entrap the organic material in an environment that facilitates smoldering combustion. For a solid organic material, the porous matrix required to facilitate smoldering may partially be the organic material itself, but for organic liquids, the porous matrix is a separate material. Smoldering combustion is maintained through the efficient recycling of energy within the system. First, the organic material is combusted, giving off heat energy which is retained by the porous matrix. Second, the retained heat energy is returned to the system from the porous matrix to pre-heat organic material farther removed from the point in space where the combustion process was initiated. Thus, following a short duration energy input to initiate the process, smoldering combustion is self-sustaining (i.e., it uses the energy of the combusting organic materials, along with a supply of oxidant, to maintain the reaction) and is capable of propagating away from the point of ignition through the combustible matter. Smoldering is the only type of combustion reaction that can propagate through an organic material/porous matrix mixture (i.e., flames are not capable of propagating through such a system). In a self-sustaining process, the heating source is terminated following the initiation of smoldering combustion.

The self-sustaining smoldering combustion process can be extended to the treatment of ARD/AMD-generating materials to remove sulfur and other compounds, if appropriate organic materials are present or added to the porous ARD/AMD-generating materials and if the following conditions are met: (1) the organic material contains sufficient inherent energy to sustain a smoldering combustion process (i.e., it is a combustible material); (2) the ARD/AMD-generating materials act as a porous matrix to enable the smoldering process; (3) a heat source is provided to initiate the process; and (4) at least one oxidant (e.g., oxygen, air) initiates and maintains the process.

The efficiency of the smoldering combustion process in removing sulfur and other compounds may be improved by conducting pre-treatment steps. Pre-treatment methods to increase smoldering temperature and/or ensure high reactivity of sulfur may enhance sulfur release or transformation during remediation. Chemical pre-treatments may include treatment with acidic, alkaline, activating, catalytic, chelating, oxidizing, reducing, or other substances to manipulate the valence state of sulfur substances and enhance their reactivity during smoldering.

The self-sustaining smoldering combustion treatment method can use solid or liquid organic materials, slurries formed from solid and liquid material, or emulsions with an organic phase.

The self-sustaining smoldering combustion process has numerous advantages over traditional ARD/AMD treatment techniques. For one, the compounds that can lead to the generation of acidic conditions are removed; thus, the smoldering combustion process mitigates the problem before it can occur. Second, the process is self-sustaining (i.e., it uses the energy of the combusting organic materials, along with a supply of oxidant, to maintain the reaction). Therefore, the smoldering combustion process avoids the need for the continuous addition of energy, heat, or fuels to maintain the high temperatures required for the removal of metal sulfides and other acid progenitors.

Definitions. As used in this description and the accompanying claims, the following terms shall have the meanings indicated, unless the context otherwise requires.

The term "porous matrix" refers to a solid material having pores (open spaces) and wherein the solid material may be a single piece having pores or a collection of granular solids having pores formed by the void spaces between granules. Examples of materials suitable for the porous matrices of embodiments of the present invention include mine tailings, crushed mine waste rock, sand, gravel, crushed stone, and combinations thereof.

The term "acid progenitor" refers to chemical species that react with air and water to create acidic conditions.

The term "acid-progenitor-containing material" refers to a material that contains an acid-progenitor. As used herein, the terms acid-progenitor containing material and ARD/AMD-generating materials are synonymous.

The term "porous acid-progenitor matrix" refers to an acid-progenitor-containing material that is structurally a porous matrix capable of self-sustaining smoldering combustion when combined with suitable organic materials. Examples of materials suitably embodying porous acid-progenitor matrices of the present invention include mine tailings, crushed mine waste rock, sand, gravel, crushed stone, and combinations thereof. As used herein, the terms "porous acid-progenitor matrix" and "porous matrix of ARD/AMD-generating materials" are synonymous.

The term "smoldering combustion" refers to the act or process of burning without flame; a rapid oxidation accompanied by heat and light but not flame. In smoldering combustion, the combustion occurs on the surface of the fuel (i.e., not in the gas phase above the fuel as with a flame), in this case, the organic material.

The term "combustion front" refers to the region within the mixture where smoldering combustion is occurring.

The term "zone of acid-progenitor-depleted material" refers to the region within the mixture where smoldering combustion has occurred, and that is depleted of acid-progenitor when compared to the same region prior to the occurrence of smoldering combustion.

The term "organic material" refers either a liquid or a solid containing organic carbon compounds or combustible compounds.

"Self-sustaining" refers to reaction conditions wherein smoldering combustion propagates through the organic material without the application of external energy; that is, when the already smoldering organic material produces sufficient heat to elevate the temperature in the adjacent material to its combustion point. Conditions may be self-sustaining even if initially the application of heat is required to initiate smoldering combustion.

The term "matrix pile" refers to any pile, mound or conglomeration of a porous matrix material. The matrix pile may be either permanent or semi-permanent.

The term "ignition" refers to the process of initiating smoldering combustion.

The term "conductive heating" refers to the transfer of thermal energy by direct physical contact.

The term "convective heating" refers to the transfer of thermal energy by the movement of fluids.

The term "radiative heating" refers to the transfer of thermal energy by electromagnetic radiation.

The term "mixing tool" refers to an implement that when in use combines or blends the organic material and porous matrix into a mass or mixture.

An "impoundment" of organic material is an aggregation of organic material in a vessel, in a pile on the ground, or in a below ground-level depression.

The term "continuous process" refers to a process whereby a mixture of organic material and porous acid-progenitor matrix is added continuously to an impoundment and acid-progenitor-depleted material is removed continuously from the impoundment.

The term "batch process" refers to a process whereby a bolus of organic material and porous matrix is added to an impoundment, smoldering combustion is allowed to occur, and acid-progenitor-depleted material is removed from the impoundment.

The term "semi-continuous process" refers to a process whereby smolderable material is added in boluses and smoldered material is removed in boluses, while smoldering occurs continuously.

FIG. 1 illustrates a mixing vessel 11, according to certain embodiments of the invention, into which an organic material and a porous matrix of ARD/AMD-generating materials are added. A mixing tool 12 is used to create an admixture of organic material and porous matrix of ARD/AMD-generating materials 13. In particular embodiments of the invention, mixing may occur within the reaction vessel or impoundment in which smoldering combustion is to be initiated. In the particular embodiment of FIG. 1, a helical mixing tool 12 is depicted, although any shape may be used, including corkscrew and paddle-shaped mixing tools.

A mixing vessel 11 may be a manufactured cylindrical column or rectangular box (e.g. stainless steel, double walled vessel) or bin, an excavated hole, designated pile, or walled-in enclosure in which a porous media of ARD/AMD-generating materials is emplaced and mixed with an organic material in preparation for application of the smoldering process.

The porous matrix may naturally contain the organic material.

Mixture emplacement may be achieved manually, via backhoe or excavator, or automatically via screw conveyor or conveyor belt systems. Liquid emplacement may be achieved via pouring, pumping, conveying by belt, or gravity feed (e.g., siphoning).

Many organic materials may be used as the fuel source for the smoldering combustion process embodied in the methods disclosed herein. Examples of organic materials for which the methods are particularly effective include hydrocarbon mixtures such as coal, coal tar and creosote, charcoal, tar, shredded tires, agricultural waste, petroleum hydrocarbons, and waste sludges. Methods described here are particularly well suited to solid or liquid organic materials such as vegetable oil, woodchips, and granular activated carbon (GAC).

Figure 2:
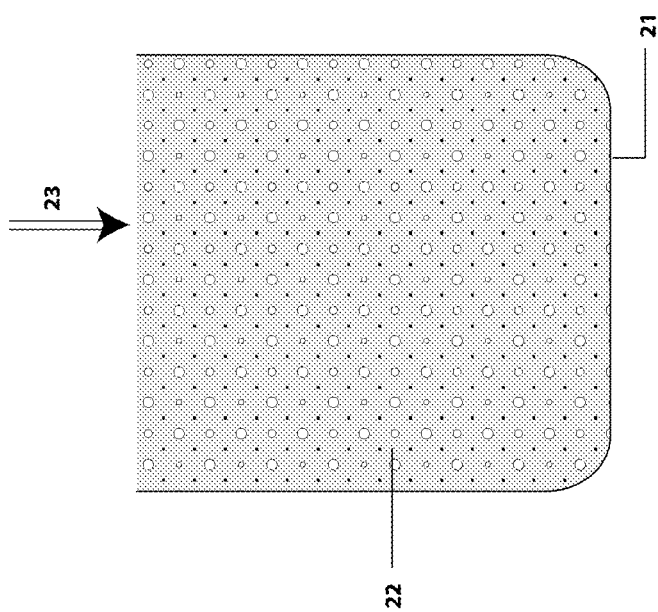
FIG. 2 is a schematic cross-sectional view of a mixing vessel of an embodiment of the invention containing a fixed or loose porous tailings matrix into which an organic material is added to create an admixture of organic material and porous matrix material.

FIG. 2 depicts another embodiment of the invention for which a mixing or reaction vessel 21 contains a porous matrix of ARD/AMD-generating materials 22 into which an organic material is added 23 to create an admixture of organic material and porous matrix material. In particular embodiments where a liquid or semi-liquid organic material is combusted, an admixture is created as the organic material percolates between the matrix particles. Mixing may be assisted by using a mixing tool as described herein. It is also possible to add solid organic waste to a porous matrix in a mixing or reaction vessel and subsequently create an admixture by using a mixing tool.

The mixing tool may be a mechanical mixer 12 such as an auger or a screw or other rotating devices. Mixing may also be achieved via vibration, or rotation (flipping) of the entire vessel. The mixing may also be achieved passively by adding organic material in the form of a liquid, a slurry, or an emulsion to the porous matrix within the vessel and allowing it to disperse naturally due to gravity or capillarity or by injecting such material under pressure into the bottom of the vessel, filling the pore space of the matrix as it migrates to the top of the vessel. The organic material may be added to the porous matrix as a flow or stream of fluids through a pipe, chute, or other emitter.

The mixing process may take place within the same vessel used for the smoldering process in a continuous, batch or semi-continuous process, or completed in a separate dedicated mixing vessel, or without any vessel (i.e., in a pile).

Addition of the matrix of ARD/AMD-generating materials 23 may be achieved manually, via backhoe or excavator, or automatically via screw conveyor or conveyor belt systems.

The conveyor system may be a screw or belt conveyor system leading from a mixing vessel to the reaction vessel and from the reaction vessel to a matrix pile. The admixture conveyor may be a screw conveyor or other mechanical conveying device or be a release mechanism to allow the gravity-fed passage of treated material through the reaction vessel.

Figure 3:
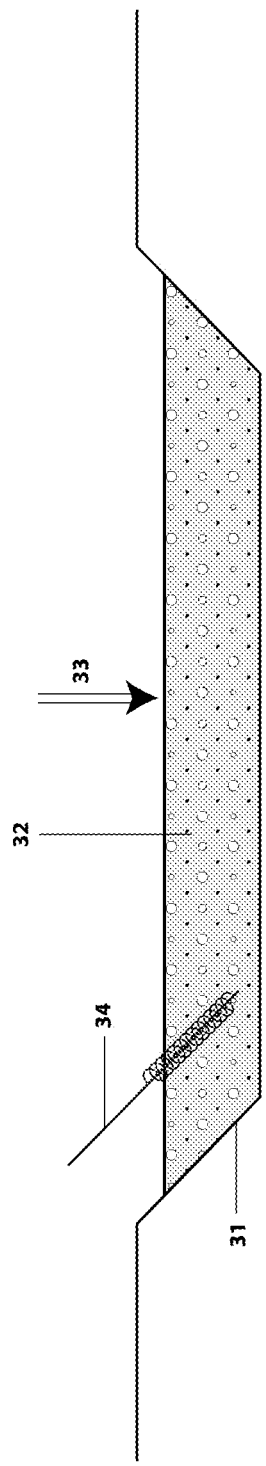
FIG. 3 is a schematic cross-sectional view of an embodiment of the invention wherein a depression containing a porous acid-progenitor matrix is agglomerated with a volume of organic material in the form of a solid, a semi-solid, a liquid, or an emulsion and admixed with a mixing tool to create an admixture of organic material and porous matrix material. In some embodiments, the organic material is organic waste.

Embodiments of the invention include impoundment of organic material with a porous acid-progenitor matrix in an above-ground vessel. However, it is also possible for the impoundment to be below ground (i.e., below the surface of the earth) in a depression. FIG. 3 illustrates an embodiment wherein the impoundment is in a depression 31. The depression includes a volume of solid, semi-solid, or liquid organic material 32 agglomerated with a porous acid-progenitor matrix 33 and admixed with a mixing tool 34 to create an admixture of organic material and porous matrix material. An example of such a depression 31 may be a lined or unlined excavation, converted pool, or natural depression. It should be appreciated that the order of addition of the porous acid-progenitor matrix and the organic material is not particularly important. Embodiments are possible where the depression is first filled with porous matrix material and the organic material is added thereafter, or where the depression is first filled with organic material and then the porous matrix material is added. Either way, an admixture is formed in a below-ground space of suitable proportions to permit smoldering combustion and treatment of ARD/AMD-generating materials.

Figure 4:
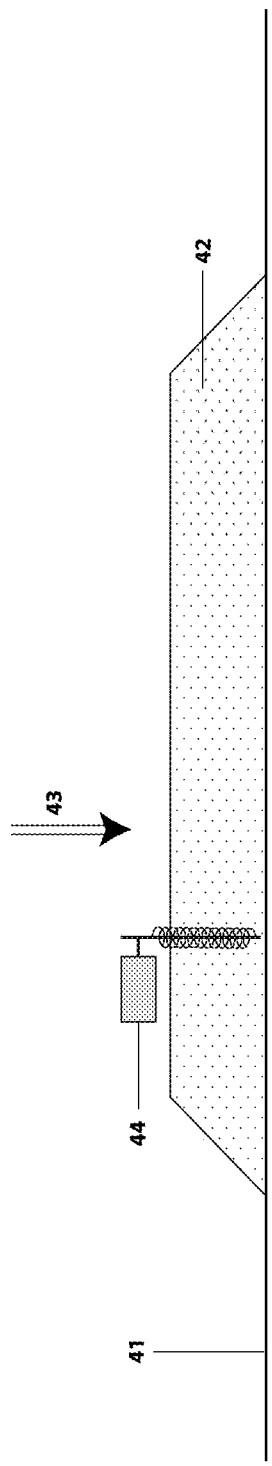
FIG. 4 is a schematic cross-sectional view of another embodiment wherein a matrix pile or mound is formed above ground, resting on the surface of the earth or a fabricated structure into which organic material is applied. In this embodiment, a mixing tool may be utilized to circulate the organic material and create the admixture.

Further embodiments are possible where the organic waste impoundment is above-ground in a matrix pile or mound. FIG. 4 illustrates such an embodiment where a matrix pile 42 rests on the surface of the earth or fabricated structure 41 into which an organic material is applied. A mixing tool 44 may be utilized to circulate the organic material 43 and create the admixture. The matrix pile may either be freestanding or may be supported within or by additional structures. For example, walls may be used to encase the pile.

An example of a matrix pile 42 may be a pile of material excavated for the construction of a depression such as a mine, or a tailings or waste rock pile. The organic material may be applied or admixed with the matrix pile by pouring the organic material onto the surface of the matrix pile through a pressurized or gravity-fed pipe, chute, or emitter, and allowing it to percolate into the matrix pile under gravity or forced pressure, tilled into the matrix pile via tillers or hoes, mixed via backhoe, excavator or soil mixing/drilling rigs.

Figure 5:
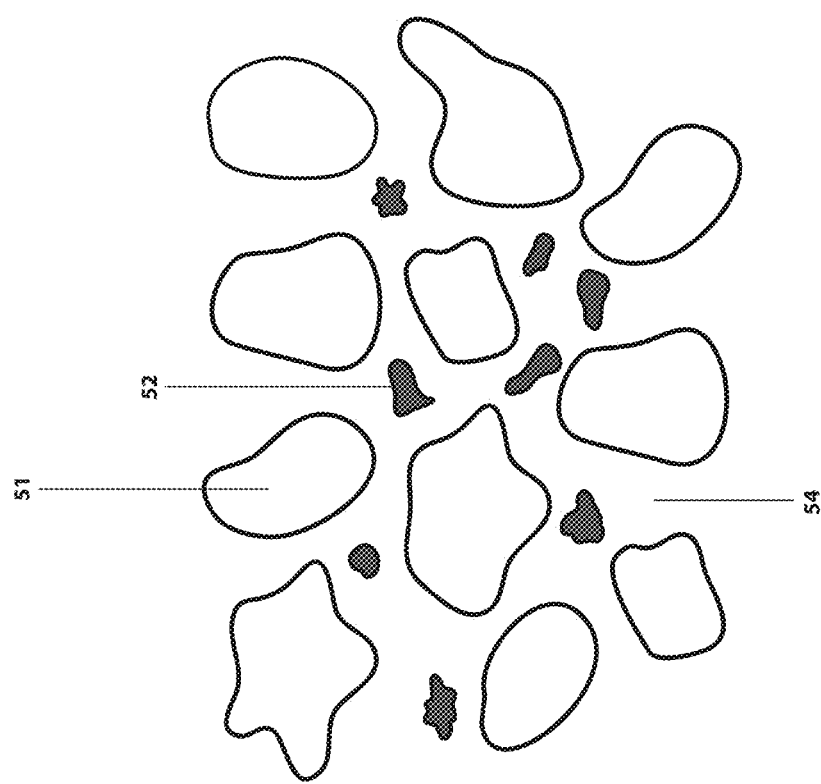
FIG. 5 is an enlarged schematic view of an embodiment wherein an organic material/porous acid-progenitor matrix mixture is admixed according to embodiments of the invention. In this embodiment, embedding combustible material in a porous matrix allows the energy released by the exothermic combustion reaction to remain in the system such that the reaction becomes self-sustaining, while facilitating the removal of compounds that can lead to the generation of ARD/AMD.

In the embodiment of FIG. 5, an organic material/porous matrix mixture includes ARD/AMD-generating solid particles 51, continuous or discontinuous chunks, pieces, blobs or ganglia of organic material 52 within the pore spaces 54 of the porous matrix. Embedding the combustible material in a porous matrix allows the energy released by the exothermic combustion reaction to remain in the system such that the reaction becomes self-sustaining, while facilitating the removal of compounds that can lead to the generation of ARD/AMD.

Further embodiments are possible where the organic material 52 is also part of the ARD/AMD-generating solid particle 51 and may not be added to the pore spaces 54 of the porous matrix.

Although the principle of heat recirculation is readily understood, its practical application requires balancing many variables to ensure efficiency, control combustion intensity (i.e., to maintain smoldering), and control the requisite temperature for treatment. Particular attributes of the porous matrix that may require optimization include porous matrix particle size, pore size, and permeability. Particular attributes of the organic material that require optimization include state, chemical composition, concentration, viscosity, density, volatility, and wettability. Particular attributes of the combustion system that require optimization include pre-heating intensity, pre-heating duration, initial oxidant flow rate, maintained oxidant flow rate, air pressure, and oxidant content.

Figure 6:
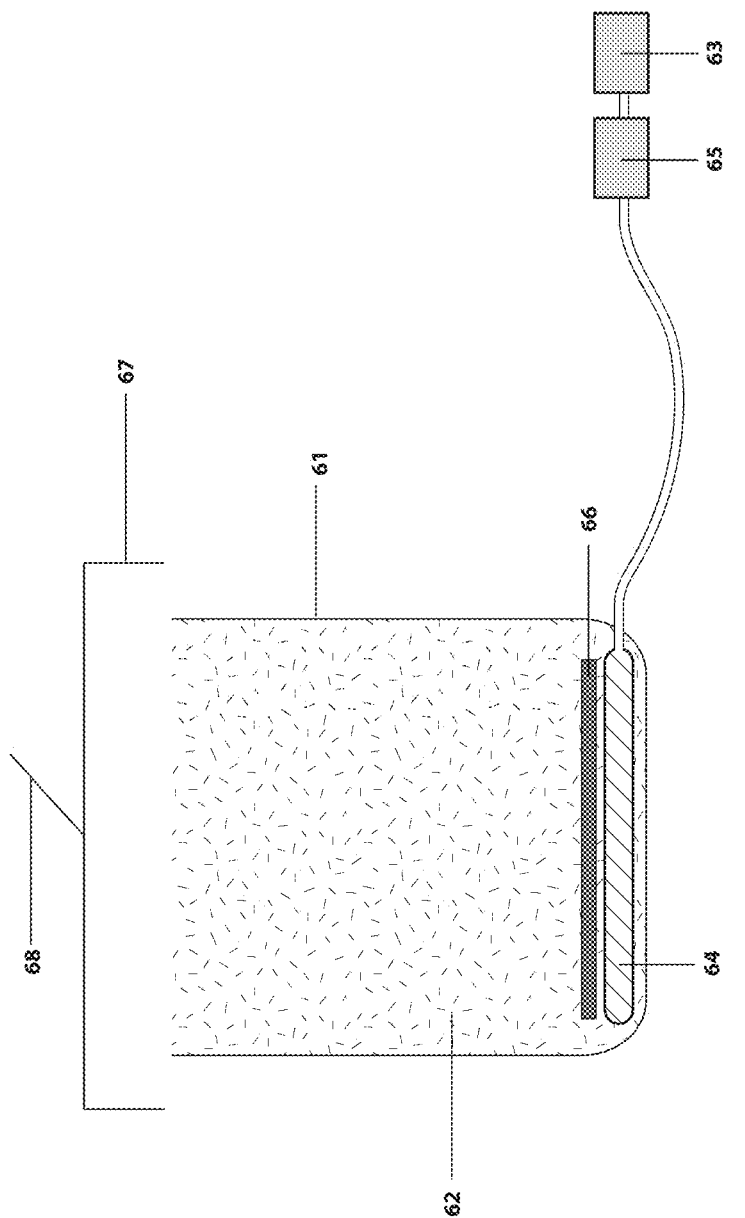
FIG. 6 is a schematic cross-section of an embodiment wherein a heating source initiates combustion and a source of oxidant initiates and maintains combustion. Oxidant is supplied through an air supply port to a combustion reaction vessel containing an admixture of organic material and a porous acid-progenitor matrix. In this embodiment, two different heating sources are present, one heating source in-line with the supplied oxidant, and one internal conductive/radiative heating source placed towards the bottom of a reaction vessel to propagate a "bottom-to-top" combustion front through an admixture of organic material and a porous acid-progenitor matrix. Vapors and products of the combustion reaction are collected at the outlet of the reaction vessel with a vapor collection system and routed by a routing system for use with subsequent processing.

Ignition of smoldering combustion requires both a heating source to initiate combustion and a source of oxidant to initiate and maintain combustion. In the embodiment of FIG. 6 a combustion reaction vessel 61 contains an admixture of organic material and a porous acid-progenitor matrix 62. Oxidant is supplied to the reaction vessel 61 from an oxidant source 63 through an air supply port 64. The air supply port 64 may comprise a single aperture into the reaction vessel or may comprise a manifold with multiple apertures placed within the reaction vessel. Two different heating sources are depicted, which may be used either alone or in combination. In the embodiment of FIG. 6, a heating source 65 is placed in-line with the supplied oxidant to supply convective heat to the admixture. Convective heating sources may also be positioned within the reaction vessel or within the interior of the reaction vessel 61. In the embodiment of FIG. 6, an internal heating source 66 is placed within the reaction vessel to supply conductive or radiative heat for ignition and maintenance of smoldering. In this embodiment, the internal conductive/radiative heating source 66 is placed towards the bottom of the reaction vessel to propagate a "bottom-to-top" combustion front. However, the heating source may alternatively be placed towards the top of the reaction vessel to propagate a "top-to-bottom" combustion front. Additional conductive heat sources may be placed throughout the interior and/or along the walls of the reaction vessel to initiate combustion at varying levels within the admixture. In the embodiment of FIG. 6, vapors and products of the combustion reaction, including sulfur and carbon compounds, are collected at the outlet of the reaction vessel 61 with a vapor collection system 67 and routed by a routing system 68 for use or subsequent processing.

In various embodiments, the oxidant source may be an air compressor, blower, or passive source connected to the reaction vessel through piping or tubing with regulated or unregulated pressure or flow. The air supply port may be a series or singular section of perforated pipe, a port, or an open cavity (plenum) to distribute oxidant in the desired pattern across the surface of the admixture. The heating element may be an electrically-powered cable heater, electrically-powered cartridge heater, electro-magnetically activated heating system, or radiative tube heater in which propane or other external fuel source is internally supplied and combusted.

In some embodiments, the air supply ports are perforated plates, screens, perforated carbon-steel, stainless-steel or other material rods, carbon-steel, stainless-steel or other material wells with wire-wrapped or slotted screens installed within the vessel. The heating elements may be electrical resistive heaters or radiative heaters installed or placed within or adjacent to the air supply ports, installed in or adjacent to the mixture surrounding the supply ports, or an element heating air passing through the supply ports and into the mixture.

In particular embodiments, the oxidant is oxygen supplied as a component of atmospheric air. The reaction is controllable such that terminating the supply of oxygen to the reaction front terminates the reaction. Increasing or decreasing the rate of oxygen flux to the reaction front will also increase or decrease the rate of combustion and, therefore, the propagation rate of the reaction front, respectively.

It should be appreciated that combustion can be monitored according to methods known to those of skill in art to determine the amounts of oxygen, air or other oxidant required to maintain smoldering combustion. Combustion temperatures are commonly monitored with thermocouples which can be placed throughout the volume of material being combusted.

Combustion gases and other vaporous compounds generated by the process are collected at the outlet of the reaction vessel or at the surface of the admixture of organic and porous matrix material.

Figure 7A:
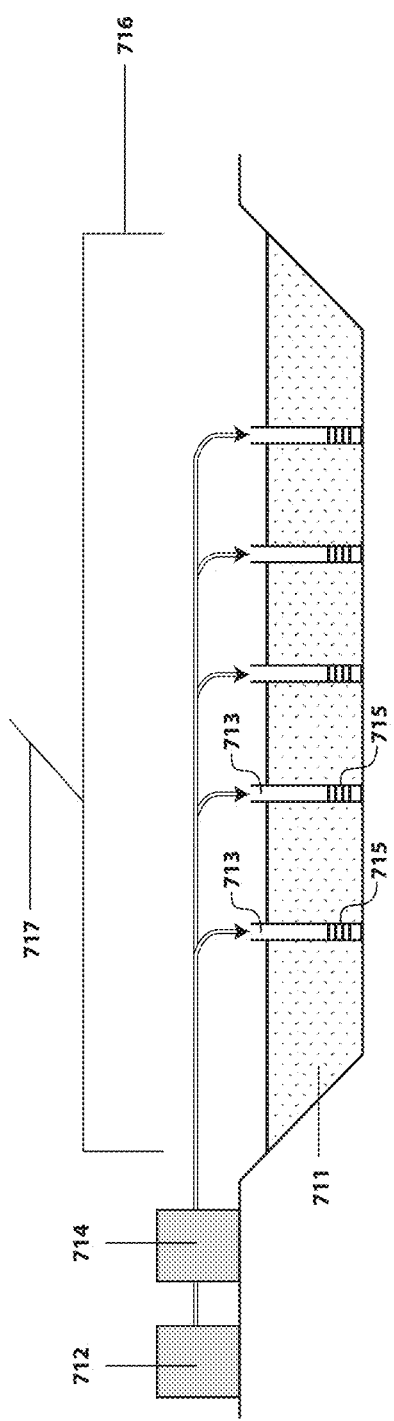
FIG. 7A is a cross-sectional schematic of an embodiment including an impoundment in the form of a depression with one or more air supply ports and heating elements, containing an admixture of organic material and porous acid-progenitor matrix. Oxidant is supplied to the depression from an oxidant supply source that is coupled to the air supply ports. The air supply ports are spaced so that oxidant is delivered in sufficient quantity and at a sufficient rate throughout the depression that smoldering combustion is facilitated throughout the depression. One or more convective heating elements are placed in-line with the supplied oxidant to initiate smoldering combustion at multiple points within the depression. Additionally, or alternatively, multiple conductive, convective or radiative heating elements are positioned within the boreholes or shafts or within backfilled materials so that they are internal to the waste depression. Vapors and products of the combustion reaction, including sulfur and carbon compounds, are collected at the surface of the depression with a vapor collection system and routed by a routing system for use or subsequent processing.
Figure 7B:
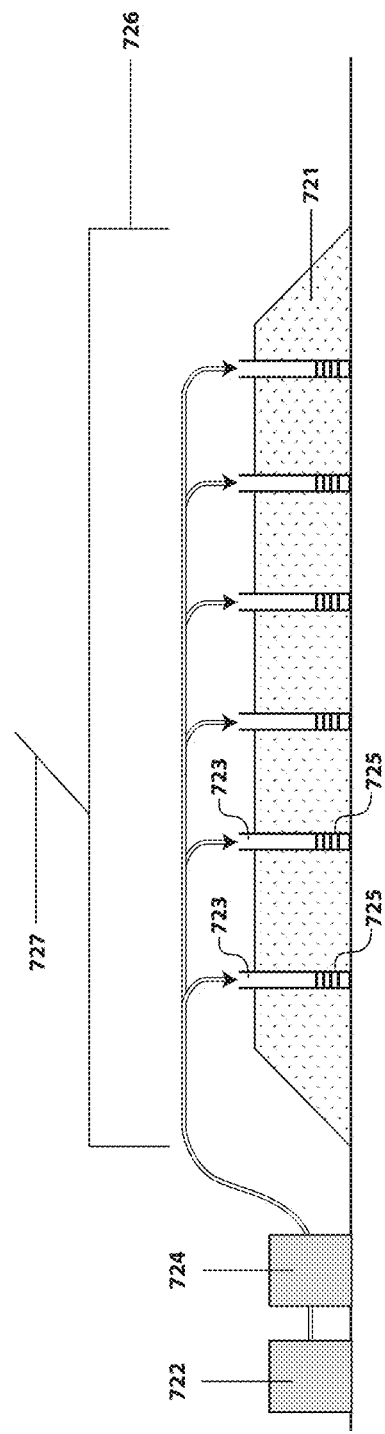
FIG. 7B is a cross-sectional schematic of an embodiment wherein an admixture of organic material and porous acid-progenitor matrix is impounded in a soil pile with one or more air supply ports and heating elements. In this embodiment as well, multiple air supply ports and heating elements are used, and oxidant is supplied to the pile from an oxidant source that is coupled to the air supply ports.

As illustrated in FIGS. 7A and 7B, some embodiments of the present invention utilize impoundments with multiple air supply ports and heating elements. FIG. 7A depicts an embodiment wherein the impoundment is a depression containing an admixture of organic material and porous acid-progenitor matrix 711. Oxidant is supplied to the depression from an oxidant source 712 that is coupled to air supply ports 713. The air supply ports may be boreholes drilled into a sufficiently solid mixture. Alternatively, the air supply port may be perforated hollow shafts inserted into either solid or relatively liquid mixtures. The air supply ports may be spaced according to the overall dimensions of the depression so that oxidant is delivered in sufficient quantity and at a sufficient rate throughout the depression; thereby facilitating smoldering combustion throughout the depression. Similarly, a single or plurality of convective heating element(s) 714 may be placed in-line with the supplied air to initiate smoldering combustion at multiple points within the depression. Additionally or alternatively, multiple conductive, convective or radiative heating elements 715 may be positioned within the boreholes or shafts or within backfilled materials so that they are internal to the waste depression. In the embodiment of FIG. 7A, vapors and products of the combustion reaction, including sulfur and carbon compounds, are collected at the surface of the depression containing an admixture of organic material and porous acid-progenitor matrix 711 with a vapor collection system 716 and routed by a routing system 717 for use or subsequent processing.

FIG. 7B is an embodiment wherein the impoundment is a pile of porous acid-progenitor matrix 721. As above, both multiple air supply ports and heating elements may be used. For example, oxidant may be supplied to the pile from an oxidant source 722 that is coupled to air supply ports 723. The air supply ports may be boreholes drilled into a sufficiently solid mixture or perforated hollow shafts inserted into either solid or relatively liquid mixtures. The air supply ports may be spaced according to the overall dimensions of the pile so that oxidant is delivered in sufficient quantity and at a sufficient rate throughout; thereby facilitating smoldering combustion throughout the pile or the portion of the pile desired for treatment. In the embodiment of FIG. 7B, one or more convective heating elements 724 are placed in-line with the supplied air to initiate smoldering combustion at multiple points within the matrix pile. Additionally or alternatively, multiple conductive, convective or radiative heating elements 725 are positioned within the boreholes or shafts or within backfilled materials so that they are internal to the matrix pile. Vapors and products of the combustion reaction, including sulfur and carbon compounds, can be collected at the surface of the matrix pile containing an admixture of organic material and porous acid-progenitor matrix 721 with a vapor collection system 726 and routed by a routing system 727 for use or subsequent processing.

FIGS. 8A and 8B illustrate additional embodiments of impoundments with air supply ports and heating elements. In the embodiment of FIG. 8A, a depression is shown containing an admixture of organic material and porous acid-progenitor matrix 811. Oxidant is supplied to the depression from an oxidant source 812 through an air supply port(s) 813 within or beneath the depression. The air supply ports 813 may comprise multiple entry points into the depression or, as depicted, a manifold-type installation placed towards the bottom of the depression. Heating element(s) 814 may be placed in-line with the supplied oxidant or within or beneath the depression. As above, the particular position of the heating element(s) and air supply ports may be optimized to facilitate smoldering combustion as needed for a given mixture. In the embodiment of FIG. 8A, vapors and products of the combustion reaction, including sulfur and carbon compounds, are collected at the surface of the depression containing an admixture of organic material and porous acid-progenitor matrix 811 with a vapor collection system 816 and routed via a routing system 817 for use or subsequent processing.

FIG. 8B is a corresponding embodiment wherein the impoundment is a matrix pile of porous acid-progenitor matrix. In FIG. 8B, a matrix pile contains an admixture of organic material and porous acid-progenitor matrix 821. Oxidant is supplied to the pile from an oxidant source 822 through an air supply port 823 within or beneath the pile. As described for the depression embodiments, several configurations of air supply ports 823 are possible, including multiple inlets and single manifold-type structures. Heating element(s) 824 may be placed in-line with the supplied oxidant to provide convective heat. Additionally or alternatively, a conductive, convective or radiative heating source 825 may be placed within or beneath the pile. Smaller, individual conductive, convective or radiative heating sources may also be placed at multiple locations within the pile. Vapors and products of the combustion reaction, including sulfur and carbon compounds, are collected at the surface of the matrix pile containing an admixture of organic material and porous acid-progenitor matrix 821 with a vapor collection system 826 and routed via a routing system 827 for use or subsequent processing.

The air supply ports may be perforated direct-push carbon-steel, stainless-steel or other material rods, carbon-steel, stainless-steel or other material wells with wire-wrapped or slotted screens installed horizontally through the matrix pile or depression. Air supply ports may also be perforations in the engineered structure supporting the mixture. The heating elements may be electrical resistive heaters or radiative heaters installed or placed within or adjacent to the air supply ports, installed in the matrix pile surrounding the air supply ports, or an above-ground element heating air passing through the air supply ports and into the matrix pile.

Embodiments of the present invention may be designed such that a combustion front propagates through a reaction vessel, depression or matrix pile. The combustion front may be directed through heating and air flow spatial manipulations to proceed upwards, downwards, or laterally in any direction.

Figure 9:
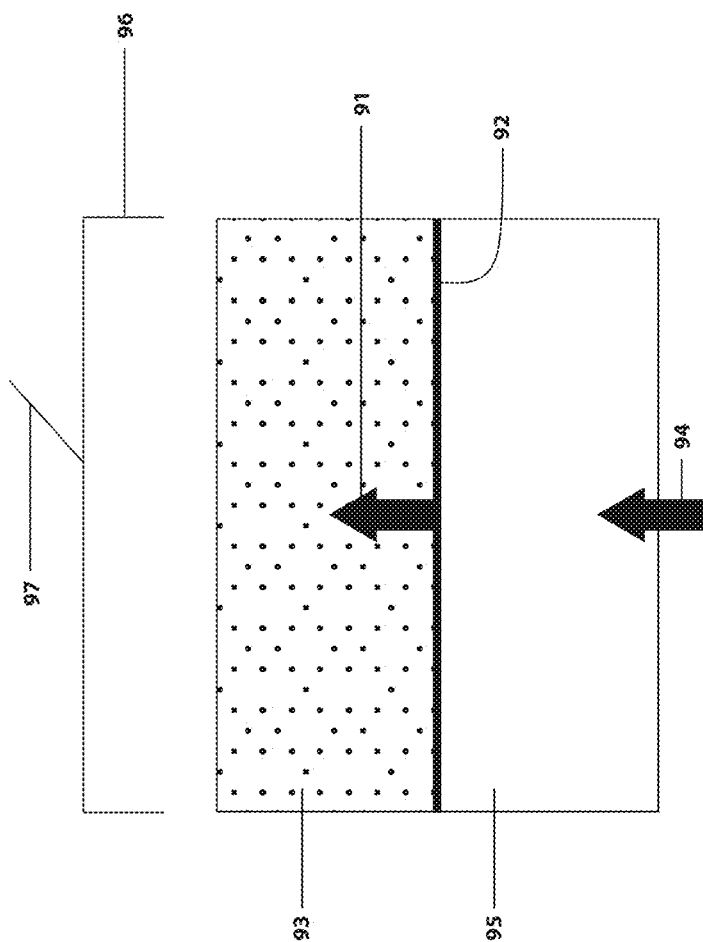
FIG. 9 is an embodiment showing a combustion front progressing through the admixture of organic material and porous acid-progenitor matrix along the direction of air flow. In this embodiment, combustion of the organic material proceeds essentially to completion, leaving behind an area of acid-progenitor-depleted material.

The embodiment of FIG. 9 illustrates the progress 91 of the combustion front 92 through an admixture of organic material and porous acid-progenitor matrix 93. In this embodiment, propagation of the combustion front proceeds along the direction of air flow 94. As the combustion front proceeds through the porous matrix, organic material within the combustion front is combusted and organic material in advance of the combustion front is heated. In this particular embodiment, combustion of the organic material proceeds essentially to completion, leaving behind an area of acid-progenitor-depleted material 95 where the organic material has undergone a volumetric reduction as a result of smoldering combustion. Vapors and products of the combustion reaction, including sulfur and carbon compounds, are driven to the collection system 96 at the outlet of the vessel or surface of the depression or pile and routed via a routing system 97 for use or subsequent processing.

Figure 10:
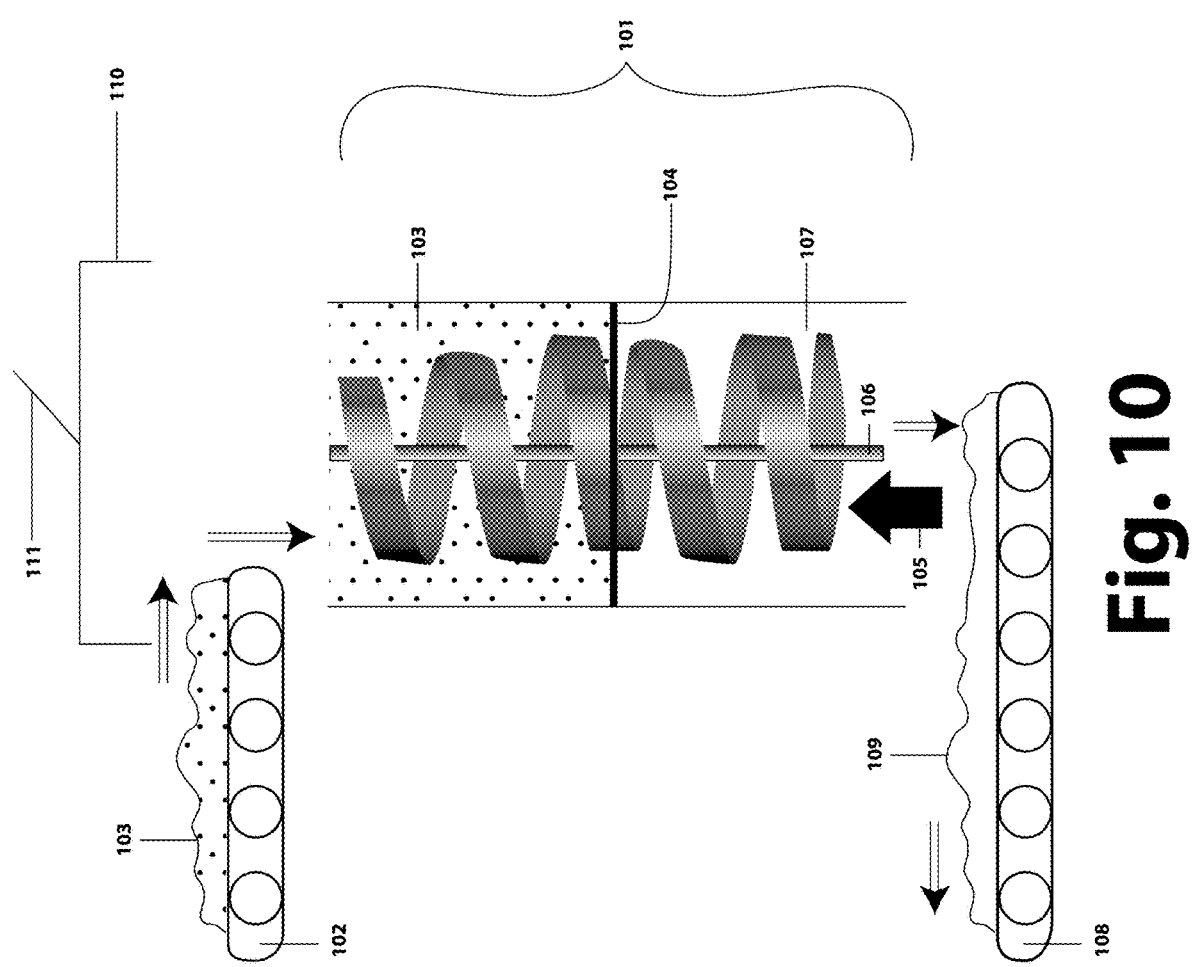
FIG. 10 is an embodiment, shown in cross-section view, of a reaction vessel where a conveyor or auger device is used to convey a continuous or semi-continuous supply of an admixture of organic material and porous acid-progenitor matrix to a smoldering combustion reaction front.

In some embodiments, the organic material/porous matrix is conveyed to the combustion front. FIG. 10 illustrates a reaction vessel 101 according to such an embodiment where a first conveyor or auger device 102 is used to convey a continuous or semi-continuous supply of an admixture of organic material and porous acid-progenitor matrix 103 to a pseudo-stationary smoldering combustion reaction front 104. The admixture supply is maintained through use of the conveyor system 102 transporting a pre-mixed admixture of organic material and porous acid-progenitor matrix 103 to the reaction vessel. The smoldering combustion reaction front is maintained through the addition of oxidant 105. A mixing or conveyor tool 106 is utilized to propagate the mixture through the reaction vessel. Although a helical mixing tool is depicted, alternatively shaped tools (e.g., corkscrews, paddles) or gravity may be used. The mixing tool may also serve to circulate oxidant through the admixture. At the combustion front, the organic material in the mixture is essentially consumed as a result of smoldering combustion 106. The resultant porous matrix 107 is withdrawn from the reaction vessel in a continuous or semi-continuous manner and transported along a second conveyor system 108 as a porous matrix 109. Vapors and products of the combustion reaction, including sulfur and carbon compounds, are driven to the collection system 110 at the outlet of the vessel or surface of the depression or pile and routed via a routing system 111 for use or subsequent processing.

Figure 11:
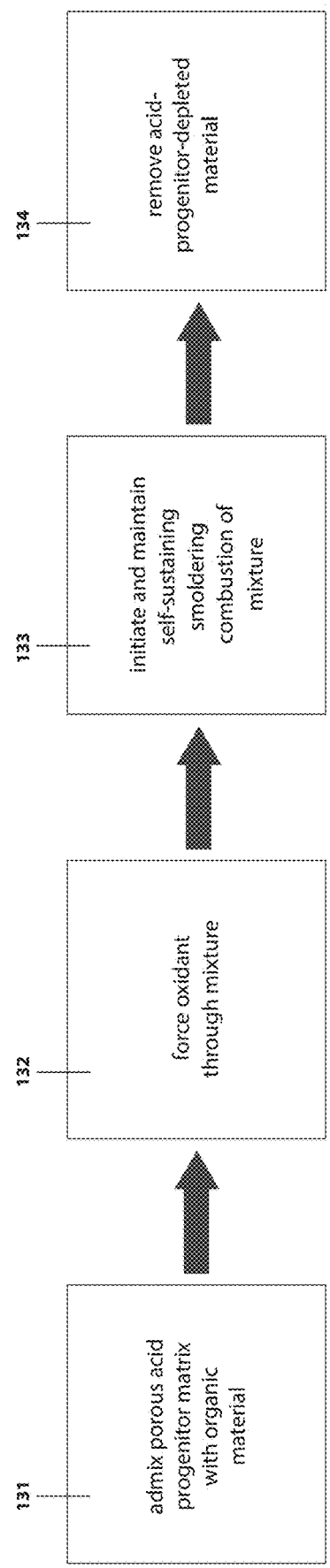
FIG. 11 is a flow diagram illustrating particular steps according to an embodiment of the invention: (1) admix a porous progenitor matrix with an organic material; (2) force oxidant through the mixture; (3) initiate and maintain self-sustaining smoldering combustion of mixture; and (4) remove acid-progenitor-depleted material.

FIG. 11 summarizes common features of multiple embodiments. Namely, a porous matrix of acid progenitor containing material is admixed with a suitable organic material 131, oxidant is forced through the mixture 132, self-sustaining smoldering is initiated and maintained 133 and acid-progenitor-depleted material is removed.

The embodiments of the invention described herein are intended to be merely exemplary; numerous variations and modifications will be apparent to those skilled in the art. All such variations and modifications are intended to be within the scope of the present invention as defined in any appended claims.

Example

Remediation of AMD-Generating Waste Solids

1. Material Preparation

Tailings samples containing porous acid-progenitor matrix materials from a gold mine were received in two approximately 20 L buckets with lids and stored at room temperature. One of the buckets was opened and surface water was drained to expose the solid sediments. Material was extracted from the bucket and placed into a glass container and allowed to air dry for 7 days. After 7 days, the material was crushed lightly with ceramic mortar and sealed in the same container.

Batches of approximately 3 kg of dry tailings solids were prepared for smoldering using a mass ratio of 1 part tailings solids to 1 part coarse sand (Chelford Dry Screen Grit, Sibelco, UK). The sample was then mixed with water to achieve a dry basis moisture content of 15% then sunflower oil was introduced to achieve a dry basis fuel content of 5% by mass. Following mixing, the material was immediately transferred to the column for smoldering.

In the smoldering column (Quartz glass column 138 mm in diameter and 275 mm in height (Multi-lab Ltd, UK)) the air diffuser was buried in coarse sand before the coiled cable heater (130 mm OD coil of 3.25 mm2 cross-section×762 mm length incolnel-sheathed cable heater (240 V, 450 W, Watlow Ltd., UK) was placed above. The tailings mixture was transferred to the column in three lifts then six 1.5 mm OD, 500 mm long type N Nicrotherm D sheath thermocouples (TC Direct, UK) were emplaced along the centerline and connected to a data acquisition system to record temperatures within the column during smoldering. A 20 mm layer of clean sand was added above the mixture as a cap.

2. Smoldering

A convective ignition protocol was used to initiate smoldering of the tailings mixture. Self-sustaining smoldering was achieved (as indicated by the detection of combustion gases in the vapor emissions) after approximately 60 min of pre-heating once a temperature of approximately 350° C. was achieved at the thermocouple embedded 10 mm above the igniter within the column. Following ignition, airflow was increased to 35 litres per minute to initiate robust smoldering in the column. After the temperature reached its peak at the first thermocouple, airflow was increased to 50 litres per minute for the remainder of the process. Power supply to the igniter was switched off after the second thermocouple registered its peak temperature. Airflow continued to be supplied to the process throughout smoldering and subsequent cool-down, terminated once temperatures returned to ambient 20° C. (the airflow was typically left running overnight for convenience).

3. Analysis

3.1. Preparation

Once materials were cooled to 20° C., the column was excavated to collect samples for analysis. The sand from the cap was removed and set aside for reuse. The post-treatment tailings mixture was excavated, placed into plastic bags, and sealed for storage for subsequent analyses.

3.2. Total Potentially Toxic Elements Including Sulphur

All materials were tested for total potentially toxic element content following USEPA Method 3051A. Samples of 0.2 g were pre-digested in a mixture of 2 mL concentrated hydrochloric acid (HCl) and 8 mL concentrated nitric acid ($HNO_3$) in unsealed digestion vessels and allowed to rest overnight. The vessels were sealed the following morning and heated to 175° C. for a period of 10 min in a CEM MARSXpress microwave digester (CEM Microwave Technology Ltd, Buckingham, UK), cooled, and diluted to 100 mL with nanopore water. Samples were analysed by induction coupled plasma optical emission spectrometry (ICP-OES). Triplicate samples were analysed for all materials.

4. Results

4.1. Combustion Test

FIG. 12 presents the thermocouple profile for the combustion test involving the tailings mixture. This combustion test demonstrated strong self-sustaining smoldering behavior; that is, temperatures at each location within the experimental apparatus continued to increase and "cross-over" temperatures at the preceding monitoring interval following the termination of the heating element. The peak temperatures recorded at each thermocouple locations within the sample ranged from approximately 800° C. to 1050° C., which is characteristic of smoldering. Different temperatures can be achieved by smoldering different added fuels.

4.2. Total S Content

Table 1 presents total sulfur (i.e., "Total S") of the samples before (i.e., "Untreated") and after (i.e., "Smoldered") smoldering treatment, indicating 75-79% reduction in total sulfur content.

TABLE 1

| | Total S Removal | | |
|---|---|---|---|
| | As received Total S (mg/kg) | Dry basis Total S (mg/kg) | % Reduction |
| Untreated | 71600 ± 6600 | 84200 ± 7800 | |
| Smoldered | 16300 ± 1600 | 16300 ± 1600 | 75-79% |

As indicated above, the peak temperatures observed within the sample ranged from approximately 800° C. to 1050° C. which is consistent with previous smoldering tests at this scale. Higher and more consistent combustion temperatures can be achieved through the smoldering of different fuels (e.g., granular activated carbon) and it is anticipated that greater total S removal can be achieved at higher temperatures.

What is claimed is:

1. A method for removing acid progenitors through smoldering combustion of an organic material, the method comprising:
   providing a mixture of the organic material, and a porous acid-progenitor matrix to an impoundment;
   heating a portion of the mixture; and
   exposing the mixture to at least one oxidant so as to initiate self-sustaining smoldering combustion of the mixture, thereby creating a zone of smoldering combustion and leaving behind a zone of acid-progenitor-depleted material,
   wherein the acid progenitors comprise sulfur containing species.

2. The method according to claim 1, wherein the impoundment is selected from a group consisting of a reaction vessel, a pile, and a depression.

3. The method according to claim 1, wherein the impoundment is selected from a group consisting of a reaction vessel, a pile, and a depression.

4. The method according to claim 1, wherein the mixture is provided to the impoundment and acid-progenitor-depleted material is removed from the impoundment by means of a process selected from a group consisting of a continuous process, a semi-continuous process, and a batch process.

5. The method according to claim 1, further comprising using a mixing tool to admix the organic material with the porous acid progenitor matrix in the impoundment to produce the mixture.

6. The method according to claim 1, wherein providing the mixture to the impoundment comprises:
forming a permanent or semi-permanent confinement bed comprising the porous acid progenitor matrix; and
continuously pouring the organic material into the permanent or semi-permanent confinement bed.

7. The method according to claim 1, wherein the organic material is selected from the group consisting of a liquid, a solid, an emulsion and a slurry.

8. The method according to claim 1, further comprising causing propagation of the smoldering combustion away from a point of ignition of the smoldering combustion.

9. The method according to claim 1, further comprising continuously feeding the mixture into the zone of smoldering combustion.

10. The method according to claim 1, wherein initiating smoldering combustion includes applying heat to the mixture from at least one internal conductive heating source in direct contact with the mixture.

11. The method according to claim 1, wherein initiating smoldering combustion includes applying heat to the mixture from at least one convective heating source coupled to the mixture.

12. The method according to claim 11, wherein the at least one convective heating source is external to the mixture.

13. The method according to claim 11, wherein the at least one convective heating source is located within the mixture.

14. The method according to claim 1, wherein initiating smoldering combustion includes applying radiative heat to the mixture.

15. The method according to claim 1, wherein exposing the mixture to at least one oxidant includes injecting air into the mixture through one or more injection ports.

16. The method according to claim 15, further comprising forcing the air through the mixture at a linear velocity of between 0.0001 and 100 centimetres per second.

17. The method according to claim 1, further comprising:
admixing a porous matrix material with the organic material using a helical mixing tool to produce the mixture;
supplying the mixture via a first conveyor system into the zone of smoldering combustion; and
removing the acid-progenitor-depleted material via a second conveyor system.

18. The method according to claim 1 further comprising carrying out the smoldering combustion at a temperature within a range between 200 and 2000 degrees Celsius.

19. The method according to claim 1, wherein initiating smoldering combustion includes applying heat to the mixture from at least one radiative heating source coupled to the mixture.

20. The method according to claim 1, further comprising subjecting the porous acid progenitor matrix to one or more pre-treatment steps with substances selected from the group consisting of acids, bases, activating compounds, catalysts, chelators, oxidants, and reducing agents, and combinations thereof.

* * * * *